US012723628B2

(12) United States Patent
Binder et al.

(10) Patent No.: US 12,723,628 B2
(45) Date of Patent: Sep. 1, 2026

(54) ELECTROMAGNETICALLY SHIFTABLE POSITIVE ENGAGEMENT CLUTCH

(71) Applicant: Hoerbiger Antriebstechnik Holding GmbH, Schongau (DE)

(72) Inventors: Jürgen Binder, Schongau (DE); Peter Echtler, Schongau (DE); Andreas Dempfle, Schongau (DE); Werner Fuerguth, Schongau (DE); Wolfgang Voelk, Schongau (DE); Oleg Butorin, Schongau (DE); Sebastian Kucharek, Schongau (DE); Marco Lautensach, Schongau (DE)

(73) Assignee: Hoerbiger Antriebstechnik Holding, Schongau (DE)

( * ) Notice: Subject to any disclaimer, the term of this patent is extended or adjusted under 35 U.S.C. 154(b) by 0 days.

(21) Appl. No.: 19/196,042

(22) Filed: May 1, 2025

(65) Prior Publication Data

US 2025/0341238 A1 Nov. 6, 2025

(30) Foreign Application Priority Data

May 3, 2024 (DE) ......................... 102024112564.0

(51) Int. Cl.
*F16D 27/108* (2006.01)
*F16D 27/118* (2006.01)
*F16D 27/14* (2006.01)

(52) U.S. Cl.
CPC .......... *F16D 27/108* (2013.01); *F16D 27/118* (2013.01); *F16D 27/14* (2013.01); *F16D 2300/18* (2013.01)

(58) Field of Classification Search
CPC ...... F16D 27/108; F16D 27/118; F16D 27/14; F16D 2300/18; F16D 11/14; F16D 2011/002; G01D 5/145
See application file for complete search history.

(56) References Cited

U.S. PATENT DOCUMENTS 8,324,890 B2 12/2012 Lin
2018/0164128 A1* 6/2018 Creech .................. F16D 27/118
2021/0301885 A1 9/2021 Essenmacher
2022/0112924 A1 4/2022 Kluge et al.
2023/0003267 A1* 1/2023 Honda ..................... G01B 7/00
(Continued)

*Primary Examiner* — Richard M Lorence

(74) *Attorney, Agent, or Firm* — McNees Wallace & Nurick

(57) ABSTRACT

An electromagnetically shiftable positive engagement clutch is shown, having a shifting sleeve which is arranged on a shaft for joint rotation therewith and is linearly displaceable along the shaft between a clutch engagement position and a clutch disengagement position, a clutch body which is aligned coaxially with the shaft, and a stator having at least one energizable drive coil for adjustment of the shifting sleeve along the shaft. Moreover, the positive engagement clutch has a stationary sensor device which is arranged adjacent to the shifting sleeve and includes at least one Hall sensor and at least two magnets that magnetically enclose the at least one Hall sensor and are permanently stationary relative to the at least one Hall sensor. The sensor device is arranged next to a face side of the shifting sleeve in an axial direction, forming an axial gap between the sensor device and the face side, so that the Hall sensor can detect the gap width in the axial direction.

14 Claims, 5 Drawing Sheets

(56) References Cited

U.S. PATENT DOCUMENTS

2023/0086003 A1* 3/2023 Binder .................... F16D 11/14
192/69
2025/0341239 A1* 11/2025 Binder .................... F16D 11/00

* cited by examiner

ELECTROMAGNETICALLY SHIFTABLE POSITIVE ENGAGEMENT CLUTCH

TECHNICAL FIELD

The present disclosure relates to an electromagnetically shiftable positive engagement clutch.

BACKGROUND

If a torque is to be temporarily transmitted from one shaft to another, coaxially aligned shaft without these two shafts being connected permanently, clutches are typically employed. A distinction is made here between frictionally engaging and positively engaging clutches. The present disclosure relates to positively engaging clutches, which are referred to herein as positive engagement clutches. Positive engagement clutches include tooth clutches and dog clutches, for example.

For positive engagement clutches, displaceable shifting sleeves are often used. These include one or also a plurality of different toothings that engage with mating toothings so that a positive engagement is produced that allows a torque to be transmitted from a first shaft to a second shaft.

Disclosed in the prior art are electromagnetic clutches in which the adjustment of the shifting sleeve takes place by means of a drive coil that exerts a magnetic force on the shifting sleeve. In clutches of this type, the shifting sleeve can be moved in one direction starting from a disengagement position in order to move the shifting sleeve into engagement with a clutch body. This is referred to as a one-sided clutch.

Furthermore, two-sided clutches are known, in which the shifting sleeve can be moved in opposite directions starting from a disengagement position in order to move the shifting sleeve into engagement with different, axially spaced apart clutch bodies.

In particular in electromagnetically shiftable positive engagement clutches, a controller is provided that controls a displacement of the shifting sleeve by means of control commands. For a best possible clutch operation process, it is necessary here to know the current position of the shifting sleeve, which is also referred to as the engagement position. The reason for this is that for each control command transmitted to the electromagnetically shiftable positive engagement clutch, the current state of engagement should first be analyzed, so that the controller should be able to interrogate the position of the shifting sleeve at any time.

In the prior art, the shifting state or the engagement position of the shifting sleeve is determined using indirect measurements, for example by the current status of the stator or the speed of the shafts to be connected.

As an alternative, a sensor may be integrated in a housing of the positive engagement clutch. This usually also involves an indirect measurement, which is carried out by means of an additional actuating component, such as, e.g., a disk which is coupled to a displaceable part, e.g. the shifting sleeve.

It is also possible to employ switches in order to determine the end position of the shifting sleeve, that is, an engagement position or disengagement position of the shifting sleeve. The switch is actuated here by a dedicated actuating part when the shifting sleeve is in the engagement position.

As an alternative to a switch, a travel measuring system may also be used, which is likewise actuated through an additional component.

The methods known in the prior art for detecting the position of the shifting sleeve thus distinguish themselves in that indirect measurements are involved, which require an additional component to be scanned or actuated. A direct and precise determination at the actual clutch engagement position is therefore not possible; rather, additional components are always required.

Furthermore, the additionally required components and the installation space required increase the manufacturing costs of the positive engagement clutch.

Besides, these measuring techniques often require precise calibration of the sensor in relation to the point of measurement, which is usually very elaborate and therefore cost-intensive.

It is therefore an object of the present disclosure to provide an electromagnetically shiftable positive engagement clutch in which the engagement position is determined by means of a direct measurement. It is also an object to keep the required installation space and the number of components required as low as possible.

SUMMARY

Example embodiments provide an electromagnetically shiftable positive engagement clutch, including a shifting sleeve which is arranged on a shaft for joint rotation therewith and is linearly displaceable along the shaft between a clutch engagement position and a clutch disengagement position. Furthermore, the positive engagement clutch includes at least one clutch body, which is aligned coaxially with the shaft, and a stator having at least one energizable drive coil for adjustment of the shifting sleeve along the shaft, wherein in the clutch engagement position there is a positive engagement between the shifting sleeve and the clutch body and thus a rotary connection between the shaft and the clutch body. Moreover, the positive engagement clutch includes a stationary sensor device which is arranged adjacent to the shifting sleeve and includes at least one Hall sensor and at least two magnets that magnetically enclose the at least one Hall sensor and are permanently stationary relative to the at least one Hall sensor, with the magnets pointing toward the shifting sleeve and having opposite polarities relative to each other. The sensor device here is arranged next to a face side of the shifting sleeve in an axial direction, forming an axial gap between the sensor device and the face side, so that the Hall sensor can detect the gap width in the axial direction.

In other words, at least one Hall sensor is fixed in a magnetic field of two oppositely polarized magnets in the positive engagement clutch axially next to the stator such that the Hall sensor can sense a change in the axial distance from the shifting sleeve and, based on this data, a controller can determine the engagement position of the shifting sleeve. Since this involves a direct measurement, no additional components are required, resulting in the manufacturing costs being reduced. In addition, Hall sensors are commonly used sensors that are available at low cost and require little space. Also in the axial direction, almost no additional installation space is required since the Hall sensor is adjacent to a face side of the shifting sleeve in a radial direction. In particular, the exact position of the shifting sleeve can be detected without, or independently of, the coil current.

Therefore, the Hall effect is made use of to determine the position of the shifting sleeve. This means that a change in an electrical voltage is measured in a current-carrying conductor that is located in a magnetic field. The change in the magnetic field upon a displacement of the shifting sleeve results in exactly such a voltage change.

Since the Hall sensor is magnetically enclosed by at least two magnets of opposite polarity, the influence of the magnetic field of the drive coil, which may lead to uncontrolled changes in the Hall effect, can be prevented. Accordingly, the magnets serve to magnetically shield the Hall sensor.

In addition, this arrangement allows a permanent magnet fastened on the shifting sleeve to be dispensed with. This can significantly reduce production costs, since a permanent magnet suitable for the shifting sleeve is a circular custom-made product, which usually considerably increases production costs.

For example, on the face side the shifting sleeve is equipped with an end disk which is engaged by a spring unit preloading the shifting sleeve into a position or location. The sensor device here is arranged next to and spaced apart from the end disk by the axial gap. The end disk thus limits the clutch control travel of the shifting sleeve and prevents the shifting sleeve from coming into contact with the sensor device and the sensor device from being damaged.

Accordingly, the necessary travel, that is, the necessary clutch control travel, of the shifting sleeve is restricted by the clutch body on one side and by the end disk on the other side. In this way, it can be ensured that a reduction or an increase in the axial gap can be detected by the Hall sensor along the entire clutch control travel of the shifting sleeve.

Here, the clutch control travel is usually a few millimeters, in particular less than 5 mm.

For example, according to one example embodiment, only a single clutch body is associated with the shifting sleeve, so that the sensor device is arranged on the axial side of the shifting sleeve remote from the clutch body. This allows installation space problems to be prevented since the sensor does not need to be arranged between the clutch body and the shifting sleeve or directly next to or above the clutch body.

According to a further example embodiment, the sensor device comprises a magnetic short-circuit bridge which is adjacent to the magnets at one end, coupling them magnetically. Using such a short-circuit bridge allows the flux of the magnetic field to be directed, i.e. the flux from one magnet to the other can be increased. The Hall sensor is thereby better shielded from the magnetic field of the stator and the signal provided by the Hall sensor is amplified so that an overall higher resolution can be achieved.

According to a preferred example embodiment, the at least two magnets are magnetically connected to each other by the short-circuit bridge at their ends remote from the shifting sleeve. Thus, despite the Hall sensor being shielded from the magnetic field of the drive coil, detection of the shifting sleeve is not prevented, with uncontrolled changes in the Hall effect being effectively prevented. Accordingly, the short-circuit bridge is for example made of a magnetically soft material.

According to a further example embodiment, the short-circuit bridge is subdivided into a first bridge part and a second bridge part. The first bridge part and the second bridge part are arranged such that a gap is produced between the two bridge parts and the Hall sensor can be arranged in the gap between the first and second bridge parts. By arranging the Hall sensor between the two bridge parts of the short-circuit bridge, the signal is amplified again as compared to the use of a continuous short-circuit bridge, so that an even higher resolution can be achieved.

According to a preferred example embodiment, each of the magnets has a magnetically soft material provided on its end remote from the split short-circuit bridge. This material also serves to guide the magnetic flux in order to amplify the signal of the Hall sensor and to prevent undesirable changes in the Hall effect due to the magnetic field generated by the stator.

According to an alternative example embodiment, the sensor device comprises at least two Hall sensors, each of the Hall sensors having a magnet associated with it, which is adjacent to the associated Hall sensor. This arrangement, too, shields the Hall sensor from the magnetic field of the drive coil so that no uncontrolled changes in the Hall effect will falsify the measuring results of the Hall sensor.

For example, the Hall sensors are adjacent to the end of the respectively associated magnet close to the shifting sleeve and are thus located between it and the shifting sleeve. In this way, the distance between the Hall sensor and the shifting sleeve can be kept as short as possible in order to obtain as accurate a measurement as possible, since the accuracy of the measurement decreases as the distance between the sensor and the shifting sleeve increases. In particular since, as already mentioned, the clutch control travel in electromagnetically shiftable positive engagement clutches are of the order of a few millimeters, a precise resolution of the Hall sensor is extremely important.

According to one example embodiment, the at least one Hall sensor is mounted on a circuit board directly or by means of one of the at least two magnets. This makes it easier to fasten the sensor device and allows the sensor signals to be directly transmitted to a controller.

The magnets may be arranged parallel to each other and/or be provided on the same side of a circuit board that also comprises the Hall sensor. By a parallel arrangement of the magnets, it can be ensured that the magnets are arranged with exactly opposite polarity, that the magnetic flux necessary for shielding is obtained and that accurate measurements are carried out.

The magnets may be permanent magnets or electromagnets.

According to one example embodiment, at least two sensor devices are provided, the at least two sensor devices being arranged offset from each other in the circumferential direction, as a result of which an unequal displacement of the shifting sleeve, for example due to a tilting of the shifting sleeve, can be detected early on. Accordingly, the shifting sleeve can also be controlled such that the tilting movement is neutralized, or a quick disengagement and re-engagement of the clutch can be briefly performed.

According to one example embodiment, the sensor device is received in a sensor housing, the sensor housing being attached to a stator housing or within a clutch housing.

DETAILED DESCRIPTION

Figure 1:
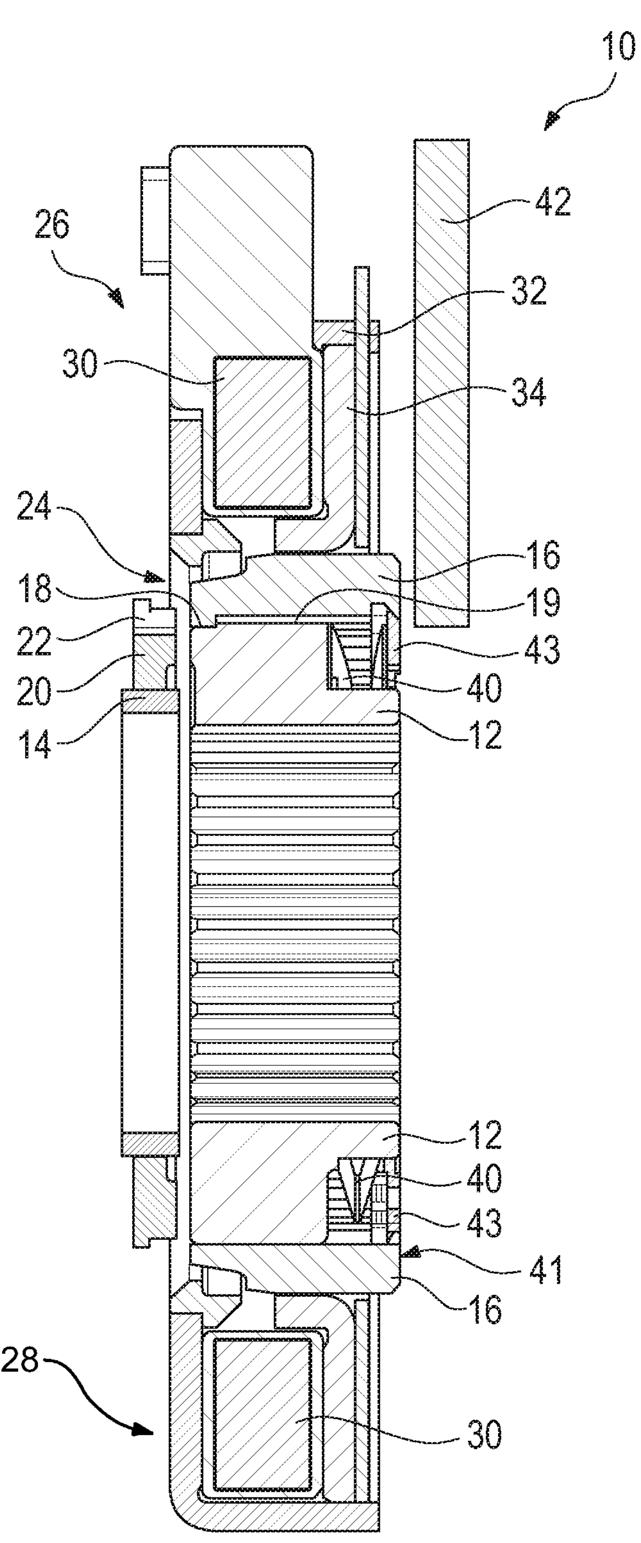
FIG. 1 shows a sectional representation of an electromagnetically shiftable positive engagement clutch according to an example embodiment, with a shifting sleeve in the disengagement position.

FIG. 1 shows an electromagnetically shiftable positive engagement clutch 10, which has the function of coupling a first shaft 12 and a second shaft 14 that is coaxially aligned with the first shaft 12 to each other by opening and closing.

The positive engagement clutch 10 shown in FIG. 1 is an electromagnetic tooth clutch having teeth that project radially inward and radially outward and engage with one another.

The electromagnetically shiftable positive engagement clutch 10 may, however, also be any other type of toothed clutch. It is only important that the connection is established by a positive engagement.

The electromagnetically shiftable positive engagement clutch 10 comprises a shifting sleeve 16, which includes a first toothing 18 laterally along the circumference.

Furthermore, the shifting sleeve 16 is arranged on a first shaft 12 for joint rotation therewith and is axially adjustable along it between a clutch engagement position and a clutch disengagement position along a toothing 19 coupling the shaft 12 and the shifting sleeve 16. FIG. 1 shows the shifting sleeve 16 in the disengagement position.

The second shaft 14 has a singular clutch body 20 associated with it, which is coupled to the second shaft 14 for joint rotation with it.

The clutch body 20 includes a second toothing 22, which is arranged along the outer circumference of the clutch body 20. Further, the clutch body 20 is aligned coaxially with the first shaft 12.

It is also conceivable, however, that the clutch body 20 forms part of the second shaft 14 and is formed integrally therewith.

The first toothing 18 and the second toothing 22 together form a clutch tooth system 24 and serve to form a positive engagement between the shifting sleeve 16 and the clutch body 20 in the engagement position of the shifting sleeve 16.

The clutch tooth system 24 formed of the first and second toothings 18, 22 may have undercuts at least on the teeth of the first toothing 18 and/or on the teeth of the second toothing 22, the undercuts being configured such that when a shifting sleeve 16 is in the clutch engagement position and a torque is applied to the positive engagement clutch 10, an additional displacement of the shifting sleeve 16 toward the clutch body 20 takes place because the circumferential force is converted into an axial displacement force. This can be achieved, for example, by undercuts that widen in a wedge shape, so that a wedge effect is produced in the direction of the clutch engagement position when a torque is transmitted.

Moreover, a stator 26 is provided which comprises a stator housing 28 and a drive coil 30 which is at least partly received in the stator housing 28.

The stator housing 28 comprises a housing pot 32, which extends along the circumference of the drive coil 30 and along a face side of the drive coil 30.

Furthermore, the stator housing 28 includes a housing ring 34 which extends along the circumference of the drive coil 30 and additionally extends on the face side of the drive coil 30 opposite to the housing pot 32.

The drive coil 30 is used for linear adjustment of the shifting sleeve 16 along the first shaft 12 toward the engagement position up to the clutch body 20.

Alternatively, it is also conceivable that the drive coil 30 is used for adjustment of the shifting sleeve 16 along the first shaft 12 toward the disengagement position of the shifting sleeve 16.

Adjustment of the shifting sleeve 16 is effected using a magnetic force that is exerted on the shifting sleeve 16 when the drive coil 30 is energized.

In order to displace the shifting sleeve back to the disengagement position, an elastic spring unit 40 is provided, by means of which the shifting sleeve 16 is coupled to the first shaft 12 so as to be displaceable in the axial direction.

The elastic spring unit 40 is arranged here between the shifting sleeve 16 and the first shaft 12 in such a way that a relative displacement of the shifting sleeve 16 in the axial direction towards the clutch engagement position results in a compression of the elastic spring unit 40. This generates a restoring force which the first elastic spring unit 40 exerts on the shifting sleeve 16.

The restoring force acts in opposition to the magnetic force of the drive coil 30.

The elastic spring unit 40 is arranged inside the shifting sleeve 16, within a recess in the shaft 12, wherein the spring unit 40 is supported in the axial direction directly against the shifting sleeve 16 or indirectly against an end disk 43 that rests against the face side 41 of the shifting sleeve 16, and against the shaft 12.

The end disk 43 here serves not only as a contact surface for the spring unit 40, but also as a stop for the shifting sleeve 16.

Accordingly, the elastic spring unit 40 is accommodated in a space which is bounded axially on the inside by the end disk 43 and axially on the outside by the shifting sleeve 16.

The spring unit 40 may for example be a wave spring or a wave spring assembly.

Figure 2:
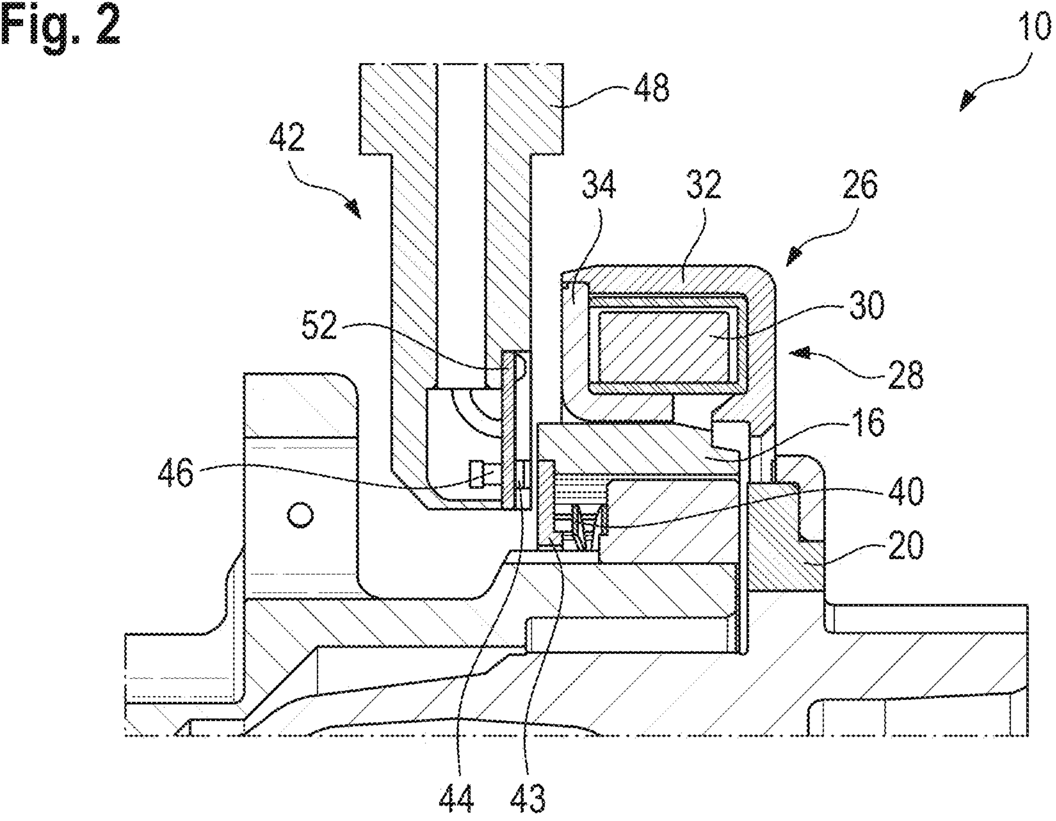
FIG. 2 shows a detailed view of the positive engagement clutch shown in FIG. 1 in the region of a sensor device.

As can be seen in particular in the detailed view in FIG. 2, the positive engagement clutch 10 in the first embodiment shown here further comprises a sensor device 42.

Figure 5:
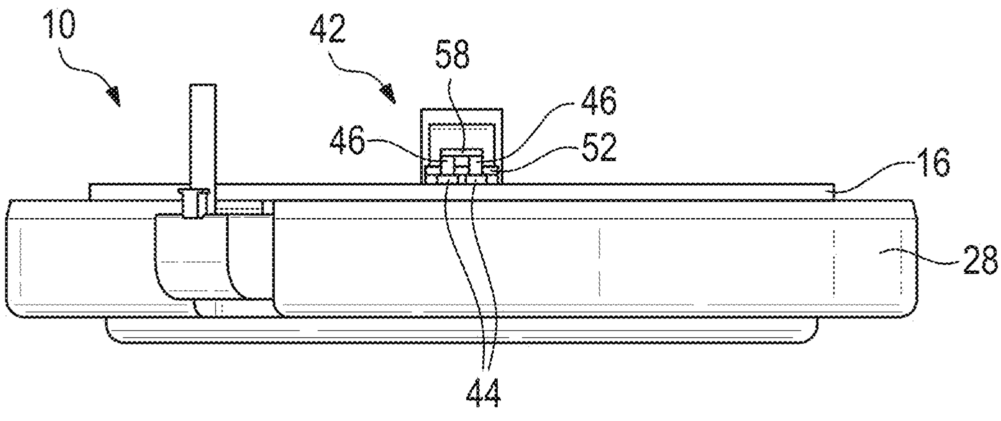
FIG. 5 shows a top view of the positive engagement clutch with a third alternative sensor device.

As can be seen in particular in FIG. 5, the sensor device 42 comprises at least two Hall sensors 44 and two magnets 46 magnetically enclosing the Hall sensors 44 and directly adjoining the Hall sensors 44.

The magnets 46 are permanent magnets or electromagnets, which are used to provide a stable magnetic field for the Hall sensors 44.

For this purpose, the magnets 46 each have one end pointing toward the shifting sleeve 16 and are permanently stationary relative to the Hall sensors 44 or are fastened thereto. In order to ensure a best possible magnetic flux, one magnet 46 points toward the shifting sleeve 16 by a positive pole and the other magnet 46 by a negative pole, i.e. they have opposite polarities.

In the exemplary embodiment shown here, each of the Hall sensors 44 has one of the magnets 46 associated with it. As mentioned, the respective magnet 46 is adjacent to the associated Hall sensor 44.

In this context, the Hall sensors 44 are arranged at the end, close to the shifting sleeve 16, of the respective magnets 46, so that the Hall sensors 44 are placed between the associated magnets 46 and the shifting sleeve 16.

The sensor device 42 is received in a sensor housing 48, which is fastened within or to a clutch housing.

The sensor housing 48 may be fastened within the clutch housing or, alternatively, to the stator housing 28 (see FIG. 4), for example by means of screws 50.

Figure 3:
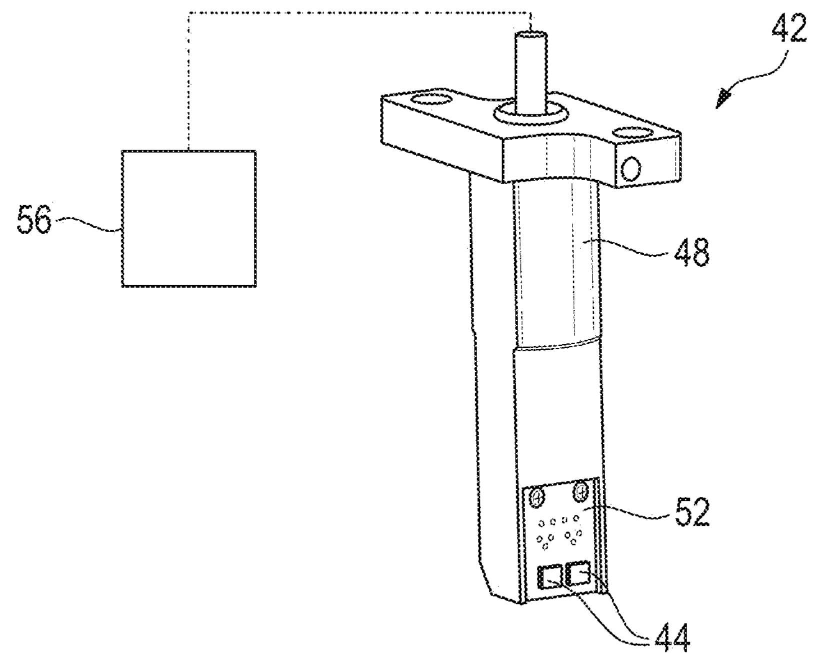
FIG. 3 shows a detailed perspective view of the sensor device shown in FIG. 2.

The sensor device 42 as may be used for installation in the clutch housing is shown in detail in FIG. 3.

As can be clearly seen in FIG. 2, for example, a circuit board 52, to which both the Hall sensors 44 and the magnets 46 are fastened, is mounted between the Hall sensors 44 and the magnets 46.

Alternatively, the Hall sensors 44 may also be mounted to the circuit board 52 by means of a respective one of the magnets 46.

The Hall sensors 44 here are each fastened on that side of the circuit board 52 or to that end of the magnets 46 which faces the shifting sleeve 16. In this way, it can be ensured that no further components are arranged between the Hall sensors 44 and the shifting sleeve 16.

The arrangement of the Hall sensors 44 directly next to the shifting sleeve 16 is advantageous in particular because the measurement accuracy of the Hall sensors 44 decreases as the distance increases. Therefore, the Hall sensors 44 should be arranged as close as possible to the shifting sleeve 16 in order to be able to determine the engagement position of the shifting sleeve 16 as accurately as possible.

The magnets 46 are not only arranged with opposite polarity, but also parallel to each other, as can be seen in FIG. 5. This allows a defined magnetic flux to be ensured between the magnets 46.

In addition, the two magnets 46 are provided on the same side of the circuit board 52.

In order that the engagement position of the shifting sleeve 16 can be determined, the sensor device 42 is arranged in an axial direction so as to be spaced apart from the face side 41 of the shifting sleeve 16 or the end disk 43 by an axial gap. When the shifting sleeve 16 moves axially, the axial gap is reduced or enlarged, depending on the direction of displacement of the shifting sleeve 16, as will be discussed later, which results in a change in the magnetic field as detected by the Hall sensor 44 or Hall sensors 44.

As shown in FIG. 1, only a single clutch body 20 is associated with the shifting sleeve 16, so that the sensor device 42 can be arranged on the side of the shifting sleeve 16 that is axially remote from the clutch body 20.

The function and operation of the positive engagement clutch 10 and the determination of the engagement position of the shifting sleeve 16 by means of the sensor device 42 will now be described below.

The initial state here is constituted by the disengagement position of the shifting sleeve 16, as shown in FIG. 1.

There is no positive engagement here between the first toothing 18 of the shifting sleeve 16 and the second toothing 22 of the clutch body 20.

In this disengaged and open state, the shifting sleeve 16 is held by the elastic spring unit 40 as long as no external forces at all act on the shifting sleeve 16, the amount of which exceeds the spring force of the spring unit 40.

This is also referred to as a positive engagement clutch 10 that is "normally open".

As long as the shifting sleeve 16 is in the disengagement position, the axial gap between the sensor device 42 and the face side 41 of the shifting sleeve 16 does not change and no signal is detected by the Hall sensors 44 of the sensor device 42.

When the shifting sleeve 16 is to be displaced from the disengagement position toward the clutch body 20, a sufficient voltage first has to be applied to the drive coil 30.

Energizing the drive coil 30 is performed here by means of a controller 56, which is responsible for any clutch operation processes and which also processes the signals of the sensor device 42 (see FIG. 3).

Accordingly, the controller 56 is connected both to the drive coil 30 and to the sensor device 42, with the controller 56 and the sensor device 42 being connected to each other at least in terms of signaling.

Connecting the controller 56 to the sensor device 42 is for example performed via the circuit board 52, wherein the sensor device 42 can be connected to the controller 56 by means of cables, lines and/or plugs.

Energizing the drive coil 30 provides a magnetic flux which causes a magnetic force to act on the shifting sleeve 16 in the direction of the clutch body 20.

When the amount of the magnetic force exceeds the amount of the spring force acting on the shifting sleeve 16 by the spring unit 40, a movement of the shifting sleeve 16 toward the clutch body 20 will occur.

This displacement of the shifting sleeve 16 results in a change in the distance between the Hall sensors 44 and the face side 41 of the shifting sleeve 16 by the axial gap between the sensor device 42 and the shifting sleeve 16 being increased.

The movement of the shifting sleeve 16 and the resultant decrease in the axial gap in turn changes the magnetic field, which causes a change in the Hall voltage, from which the engagement position of the shifting sleeve 16 can be inferred.

As a result, the shifting sleeve 16 is in the clutch engagement position. When the drive coil 30 is energized, a magnetic holding force acts on the shifting sleeve 16.

To ensure that each and every position of the shifting sleeve 16 between the clutch disengagement position and the clutch engagement position can be identified, the necessary travel, that is, the necessary shifting travel, of the shifting sleeve 16 must not be greater than the measuring range of the Hall sensor 44 to be detected at the maximum. Typically, the necessary travel of the shifting sleeve 16 is a few millimeters, in particular 5 mm at the maximum.

In the clutch engagement position, the first toothing 18 and the second toothing 22 engage with each other so that there is a positive engagement between the shifting sleeve 16 and the clutch body 20.

As already mentioned, it is possible for the first toothing 18 and/or the second toothing 22 to be provided with lateral undercuts in the axial direction and in the direction of the clutch engagement position.

If the two toothings 18, 22 include undercuts, a torque transmission between the clutch body 20 and the first shaft 12 results in a force being produced that acts on the shifting sleeve 16 in the direction of the clutch engagement position, that is, toward the clutch body 20, due to the undercuts and the resulting wedge effect between the contacting teeth.

Here, the force acting on the shifting sleeve 16 is significantly dependent on the geometry of the undercuts of the toothings 18, 22 and the prevailing torque.

While the shifting sleeve 16 is in the clutch engagement position, the axial gap does not change, so that no change in the Hall voltage can be detected by the Hall sensors 44.

Now when the shifting sleeve 16 is to be moved back to its disengagement position, it is first necessary to reduce or cancel the magnetic force that is generated by energizing the drive coil 30.

If the amount of the magnetic force acting on the shifting sleeve 16 is below the amount of the restoring force exerted by the elastic spring unit 40 acting on the shifting sleeve 16, this results in a displacement of the shifting sleeve 16 from the clutch engagement position back to the clutch disengagement position.

In this state, the shifting sleeve 16 is held by the spring force of the elastic spring unit 40.

When the shifting sleeve 16 is displaced from the clutch engagement position to the clutch disengagement position, the axial gap between the sensor device 42 and the face side 41 of the shifting sleeve 16 is reduced and a Hall voltage is also detected as a result of the varying magnetic field.

Figure 4:
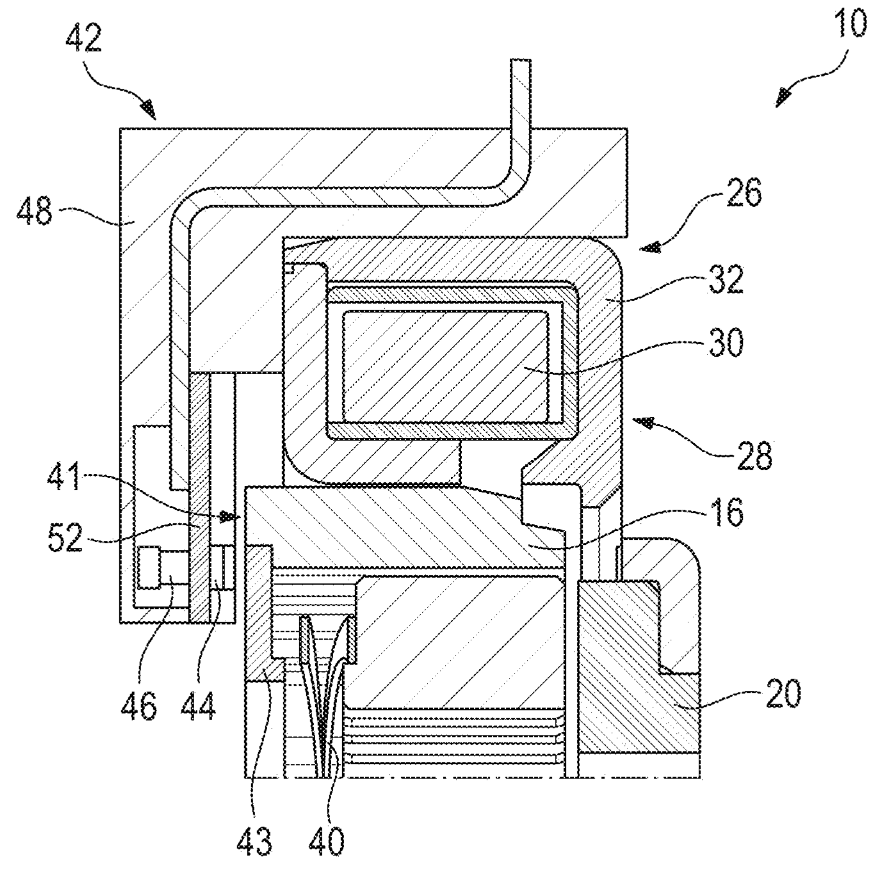
FIG. 4 shows a further example embodiment of the positive engagement clutch according to an example embodiment with an alternative sensor device.

FIG. 4 shows an alternative embodiment of the positive engagement clutch 10. The difference from the embodiment described previously is that the sensor device 42 is fastened directly to the stator housing by means of the sensor housing 48.

The structure and mode of operation of the positive engagement clutch 10 and the sensor device 42 are otherwise identical with the embodiment shown in FIGS. 1 to 3.

A further embodiment is shown in FIG. 5. In this embodiment, the sensor device 42 includes a magnetic, continuous short-circuit bridge 58 that engages the ends of the magnets 46 remote from the shifting sleeve 16 and thus connects and magnetically couples the magnets 46 to each other.

The magnetic flux between the at least two magnets 46 is directed by such a short-circuit bridge 58, so that the Hall sensors 44 are enclosed by a stronger magnetic field. In this way, the Hall sensors 44 are effectively shielded from the magnetic field generated by the drive coil 30 to prevent undesired changes in the Hall effect due to the magnetic field of the drive coil 30.

Accordingly, the short-circuit bridge 58 preferably consists of a magnetically soft material, such as, for example, ferromagnetic metals or metal oxides.

Not shown in the Figures is a further embodiment of the positive engagement clutch 10, in which two sensor devices 42 are provided.

The configuration of the sensor device 42 and the determination of the position of the shifting sleeve 16 do not change.

The two sensor devices 42 are arranged offset from each other in the circumferential direction, for example by 180 degrees.

By determining the engagement position of the shifting sleeve 16 using at least two sensor devices 42, it is also possible to detect, in addition to the current engagement position, whether the shifting sleeve 16 is slightly tilted.

If this is the case, the controller 56 can output an appropriate control command that will orient the shifting sleeve 16 perpendicular to the first shaft 12 again, or the shifting sleeve 16 is quickly shifted to the clutch disengagement position and back to the clutch engagement position.

Figure 6:
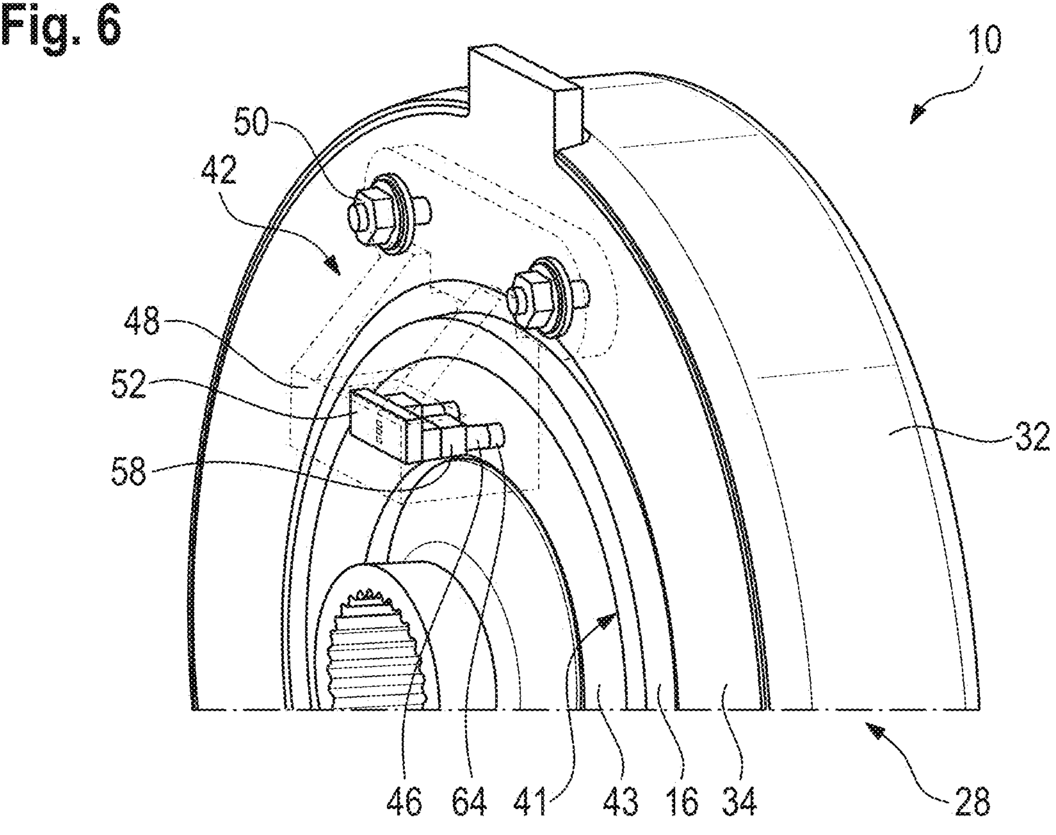
FIG. 6 shows a perspective view of the positive engagement clutch with an alternative, fourth sensor device.
Figure 7:
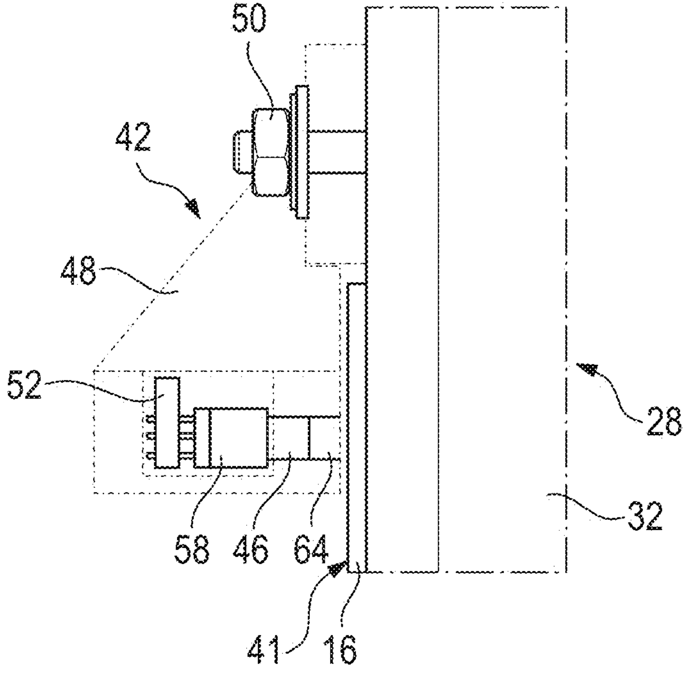
FIG. 7 shows a detailed sectional view of the sensor device shown in FIG. 6.
Figure 8:
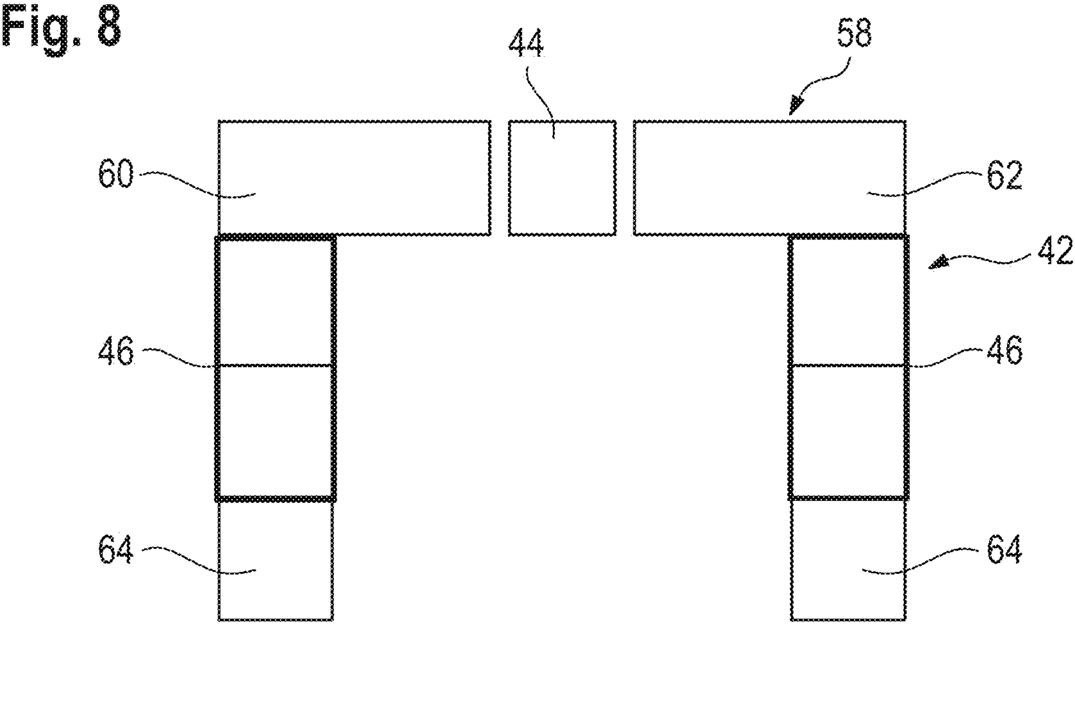
FIG. 8 shows a schematic illustration of the sensor device shown in FIG. 6.

FIGS. 6 to 8 show a further embodiment of the sensor device 42, which can also be used to determine the engagement position of the shifting sleeve 16.

The sensor device 42 shown here likewise comprises the magnetic, split short-circuit bridge 58. Here, the magnetic short-circuit bridge 58 is magnetically coupled to the magnets 46 and is adjacent to an end of the respective magnet 46 remote from the shifting sleeve 16.

As already mentioned, such a magnetic short-circuit bridge 58 serves to direct the flux of the magnetic field of the two magnets 46 and to shield the Hall sensor 44 or Hall sensors 44 from the magnetic field of the drive coil 30, since the magnetic field of the drive coil 30 may lead to uncontrolled changes in the Hall effect.

Accordingly, the signal detected by the Hall sensor 44 can be amplified by using a short-circuit bridge 58, so that a higher resolution can be achieved.

In the embodiment shown in FIGS. 6 to 8, the short-circuit bridge 58 is subdivided into a first bridge part 60 and a second bridge part 62, which is clearly visible in particular in FIG. 8.

Each of the bridge parts 60, 62 is associated with one of the magnets 46 and is attached to the side thereof remote from the shifting sleeve 16, so that the respective bridge part 60, 62 extends to the respective other magnet 46.

The bridge parts 60, 62 are arranged here in such a way that a gap is produced between them, in which the Hall sensor 44 is arranged.

Owing to the use of such a split short-circuit bridge 58, it is sufficient to use only one Hall sensor 44.

In addition to the short-circuit bridge 58, in the embodiment shown here, a magnetically soft material 64 is optionally provided on each of the magnets 46 on the ends thereof remote from the split short-circuit bridge 58.

This magnetically soft material 64 may be the same magnetically soft material as that used for the short-circuit bridge 58.

Figure 9:
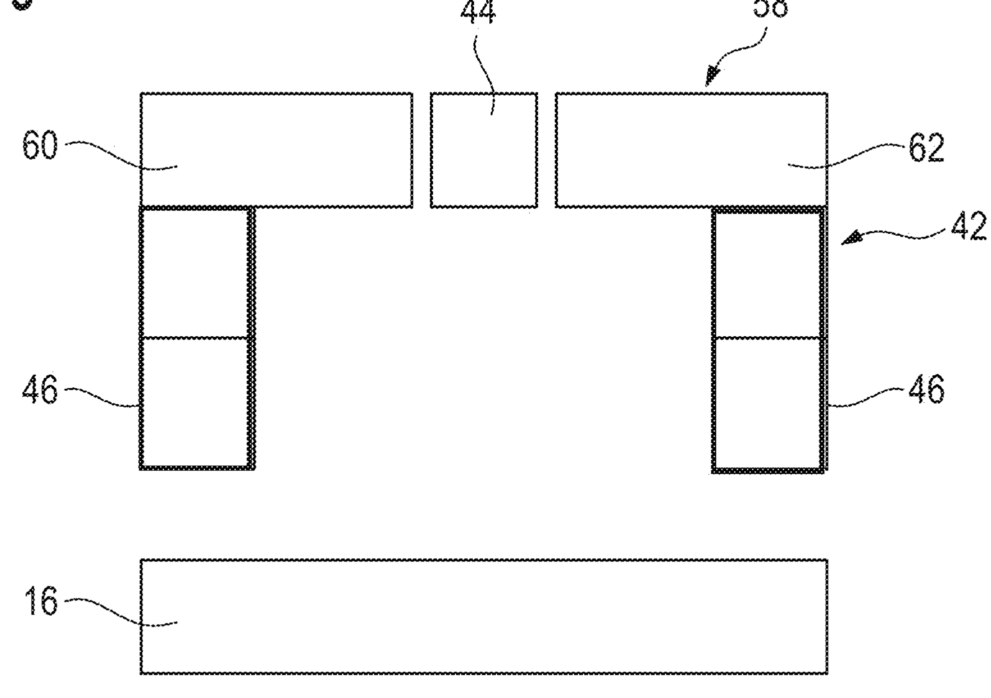
FIG. 9 shows a schematic illustration of a fifth alternative configuration of the sensor device.

FIG. 9 shows an embodiment of the sensor device 42 that essentially corresponds to the sensor device 42 of FIGS. 6 to 8. The difference is that in the embodiment according to FIG. 9, no magnetically soft material 64 is provided at the ends of the magnets 46 remote from the short-circuit bridge 58.

Of the sensor devices 42 shown in FIGS. 6 to 9, two respective sensor devices 42 may also be provided in order to also detect and rectify any tilting of the shifting sleeve 16.

While a positive engagement clutch 10 having one clutch body 20 has been described in the Figures, the sensor device 42 may also be installed in a two-sided positive engagement clutch 10.

For this purpose, for example, a Hall sensor 44 having a higher resolution may be used so that the Hall sensor 44 can detect the position of the shifting sleeve 16 along the entire clutch control travel, that is, the sum of the respective clutch control travels in both directions.

The positive engagement clutch 10 illustrated distinguishes itself in that no add-on parts need to be attached to the shifting sleeve 16 to be able to detect the position of the shifting sleeve 16.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An electromagnetically shiftable positive engagement clutch, comprising:

a shifting sleeve which is arranged on a shaft for joint rotation therewith and is linearly displaceable along the shaft between a clutch engagement position and a clutch disengagement position;

at least one clutch body which is aligned coaxially with the shaft;

a stator having at least one energizable drive coil for adjustment of the shifting sleeve along the shaft, wherein in the clutch engagement position there is a positive engagement between the shifting sleeve and the clutch body and thus a rotary connection between the shaft and the clutch body, and a stationary sensor device which is arranged adjacent to the shifting sleeve and comprises at least one Hall sensor and at least two magnets that magnetically enclose the at least one Hall sensor and are permanently stationary relative to the at least one Hall sensor, the magnets pointing toward the shifting sleeve and having opposite polarities relative to each other, and wherein the sensor device is arranged next to a face side of the shifting sleeve in an axial direction, forming an axial gap between the sensor device and the face side, the at least one Hall sensor being adapted to detect the gap width in the axial direction.

2. The electromagnetically shiftable positive engagement clutch according to claim 1, wherein the face side the shifting sleeve is equipped with an end disk which is engaged by a spring unit preloading the shifting sleeve into a position, the sensor device being arranged next to and spaced apart from the end disk by the gap.

3. The electromagnetically shiftable positive engagement clutch according to claim 1, wherein only a single clutch body is associated with the shifting sleeve and the sensor device is provided on the axial side of the shifting sleeve remote from the clutch body.

4. The electromagnetically shiftable positive engagement clutch according to claim 1, wherein the sensor device comprises a magnetic short-circuit bridge which is adjacent to the magnets at one end, coupling them magnetically.

5. The electromagnetically shiftable positive engagement clutch according to claim 4, wherein the at least two magnets are connected to each other by the short-circuit bridge at their ends remote from the shifting sleeve.

6. The electromagnetically shiftable positive engagement clutch according to claim 4, wherein the short-circuit bridge is subdivided into a first bridge part and a second bridge part, wherein the first bridge part and the second bridge part are arranged such that a gap is produced between the two bridge parts, and wherein the at least one Hall sensor is arranged in the gap between the first and second bridge parts.

7. The electromagnetically shiftable positive engagement clutch according to claim 6, wherein each of the magnets has a magnetically soft material provided on its end remote from the split short-circuit bridge.

8. The electromagnetically shiftable positive engagement clutch according to claim 1, wherein the sensor device comprises at least two Hall sensors, wherein each of the Hall sensors has a magnet associated with it, which is adjacent to the associated Hall sensor.

9. The electromagnetically shiftable positive engagement clutch according to claim 8, wherein the at least two Hall sensors are adjacent to the end of the respectively associated magnet close to the shifting sleeve and are located between it and the shifting sleeve.

10. The electromagnetically shiftable positive engagement clutch according to claim 1, wherein the at least one Hall sensor is mounted on a circuit board directly or by means of one of the at least two magnets.

11. The electromagnetically shiftable positive engagement clutch according to claim 1, wherein the magnets are arranged in parallel and/or are provided on the same side of a circuit board that also comprises the at least one Hall sensor.

12. The electromagnetically shiftable positive engagement clutch according to claim 1, wherein the magnets are permanent magnets or electromagnets.

13. The electromagnetically shiftable positive engagement clutch according to claim 1, wherein at least two sensor devices are provided, wherein the at least two sensor devices are arranged offset from each other in the circumferential direction.

14. The electromagnetically shiftable positive engagement clutch according to claim 1, wherein the sensor device is received in a sensor housing, the sensor housing being attached to a stator housing or within a clutch housing.

* * * * *